US011673691B2

(12) United States Patent
Reiners

(10) Patent No.: US 11,673,691 B2
(45) Date of Patent: Jun. 13, 2023

(54) CONTROL DEVICE FOR CONTROLLING A KITE STEERING ARRANGEMENT

(71) Applicant: Oceanergy AG, Berlin (DE)

(72) Inventor: Wolfram Reiners, Cape Town (ZA)

(73) Assignee: OCEANERGY AG, Berlin (DE)

( * ) Notice: Subject to any disclaimer, the term of this patent is extended or adjusted under 35 U.S.C. 154(b) by 361 days.

(21) Appl. No.: 16/890,134

(22) Filed: Jun. 2, 2020

(65) Prior Publication Data

US 2020/0377229 A1 Dec. 3, 2020

(30) Foreign Application Priority Data

Jun. 3, 2019 (GB) ..................................... 1907883

(51) Int. Cl.
| | |
|---|---|
| *B64C 31/06* | (2020.01) |
| *B64F 3/00* | (2006.01) |
| *B63H 8/16* | (2020.01) |
| *B63H 9/072* | (2020.01) |
| *B64F 3/02* | (2006.01) |

(52) U.S. Cl.
CPC ................ *B64F 3/00* (2013.01); *B64C 31/06* (2013.01); *B64F 3/02* (2013.01); *B63H 8/16* (2020.02); *B63H 9/072* (2020.02)

(58) Field of Classification Search
CPC .. B64C 31/06; B64F 3/00; B63H 8/16; B63H 9/072
See application file for complete search history.

(56) References Cited

U.S. PATENT DOCUMENTS

| | | | |
|---|---|---|---|
| 2015/0048621 A1* | 2/2015 | Smeenk | .................... F03D 5/00 290/55 |
| 2016/0159448 A1* | 6/2016 | Reiners | .................. B63H 9/072 114/102.16 |

FOREIGN PATENT DOCUMENTS

| | | | | |
|---|---|---|---|---|
| KR | 101500898 B1 * | 3/2015 | ............. | Y02E 10/70 |
| WO | WO-2011076270 A1 * | 6/2011 | ........... | B63H 9/0685 |

* cited by examiner

*Primary Examiner* — Nicholas McFall
(74) *Attorney, Agent, or Firm* — Lippes Mathias LLP

(57) ABSTRACT

A control device for controlling a kite steering arrangement, including a base, a control bar support extending downward on the base, a control bar pivot point mounted displaceably about the control bar support, a pair of interconnecting members extending between opposing end regions of the control bar and the base upper the control bar support, a tensioning mechanism, a base pivot point, a base rotator for allowing rotation of the base about a vertical axis thereof, a manipulator that manipulates the base pivot point and base rotator, and a communicator, that communicates adjustment of the interconnecting members to the kite steering arrangement. The length aspect of the interconnecting members is adjusted by pivoting the control bar about the control bar pivot point and/or by displacement of the control bar pivot point relative the control bar support.

26 Claims, 17 Drawing Sheets

CONTROL DEVICE FOR CONTROLLING A KITE STEERING ARRANGEMENT

RELATED APPLICATIONS

This application claims priority to Great Britain Patent Application No. GB1907883.1 entitled "Control Device for Controlling a Kite Steering Arrangement," filed Jun. 3, 2019.

FIELD OF THE DISCLOSURE

This invention relates to a control device for giving input to a kite steering arrangement which in turn is connected to kite connecting lines for steering a kite by manipulating the respective lengths of the kite connecting lines, or alternatively, the kite steering arrangement may be connected to actuators at the kite itself, in form of yaw rudders, pitch elevators, roll-ailerons, or a moving tether attachment point(s). More particularly, the invention relates to a control device for indirectly steering a kite by manipulating the kite steering arrangement based on multi-sensory feedback about the position, orientation and movement of the kite, and the forces the kite exerts on its tethers.

BACKGROUND

Reiners U.S. Pat. No. 9,828,078 describes a steering arrangement for large kites, which can for instance be used to tow large ships. A kite is tethered to the ground or to the deck of a watercraft by means of several ropes, typically three or four. The ropes have a mixed functionality, both as traction ropes and to control the kite. This control or steering is effected by manipulating the length of the ropes.

Others, for instance WO2008031446, describe how to control a kite from a gondola, which is suspended under the wing in the air, by varying the distance between attachment points between the gondola and the wing. One traction rope connects the gondola to the watercraft or to the ground. Yet others have suggested to control a kite with actuators located directly at the wing, either by manipulating the suspension of the connecting lines, or with moveable actuators, in a similar way just as one steers an airplane around several axes.

A number of systems to control or to steer kites have been suggested, also for the purpose to drive generators in order to produce green electricity, either directly or by propelling vehicles or watercrafts, which in turn are equipped with generators that turn towing power into green electricity.

The input to these kite control systems can come from either a computer, or from a hand-controlled manual device, which serves a human pilot. Known forms include control stick arrangements, which are well known for instance for the application to steer aircrafts, or cranes, or earth-moving machines, or model airplanes, or joysticks for video games. These control sticks can be used to control the actuators of these applications.

For kites, one control stick can for instance control the reeling-out and reeling-in of the kite connecting line(s), while another control stick can control the "angle of attack" of the wing, or power/de-power of the kite, by giving input to manipulate the length of the kite connecting lines, which lead to the trailing end of the kite, and to manipulate the length of the kite connecting lines, which lead to the front end of the kite, or by giving input to actuators at the wing itself, for this purpose. This same control stick, around a second axis, or another control stick, can be used to steer the kite left or right, by giving input to manipulate the length of the kite connecting lines, which lead to the left side of the kite, and those leading to the right side of the kite, or, again, by giving input to actuators at the wing itself, for this purpose.

However, such control arrangements also have a number of limitations and disadvantages. Firstly, when the visibility from the pilot to the kite is low, for instance at night, or in conditions with rain, snow or fog, these systems provide very little feedback about the kite's position and flight trajectory to the pilot.

This could be compensated for example by measuring the position of the kite by suitable means and simulating it to the pilot on a screen display. Secondly, control stick arrangements, possibly in conjunction with screen displays or other forms of displays may only give visual or auditory feedback to the pilot, but no or very limited sensory or haptical feedback to the pilot, such as the position of the kite or the tension forces on the kite connecting lines.

Reiners U.S. Pat. No. 9,828,078 discloses a control device, which includes a simulation member to receive information about the spatial orientation of kite connecting lines, and/or the spatial orientation of their mounting member on a watercraft, and/or about the spatial orientation of the kite itself. The simulation member positions the control device accordingly to, thereby, give a pilot a real time indication of the spatial orientation of kite connecting lines, and/or their mounting members, and/or the kite's position or spatial orientation, relative the watercraft. Also included are sensors for measuring actual tensional forces experienced by the various kite connecting lines or ropes, the translation of the actual tensional force into relative tensional forces for exertion on the control device, to thereby giving the pilot a real time indication of the actual tensional forces experienced by the kite connecting lines.

It is an objective of the present invention to improve such prior art and to give a human pilot enhanced visual, sensory and haptic feedback to enable the pilot to fly the kite in a more precise, effective, and efficient manner.

The kite steering arrangement can be controlled from a base station on the ground, on a vehicle, on a swimming platform, or on the deck of a ship.

The kite may be tethered to the ground, a vehicle, a swimming platform, or to the deck of a ship, or to a generator on these ground stations, by any form of kite connecting lines, cables or ropes.

SUMMARY OF THE DISCLOSURE

For the purpose of this specification the term "kite" shall mean to include a wing, irrespective whether it is manufactured from hard, semi-rigid, soft or inflatable structures, a sail, an airfoil, a wing profile, a glider, a paraglider, a parakite, and any other similar wind engagement element, and connected to the ground by a line or by a plurality of lines, and capable of being lifted aerodynamically by the wind. The singular version "kite" shall also imply a plurality of such kites. These can for instance be suspended on the lines in sequence or in parallel.

For the purpose of this specification the phrase "kite steering arrangement" shall mean to include any steering arrangement for steering a kite. The kite steering arrangement can therefore include deflectors, reels, winches, hoists, actuators and any other mechanical means to adjust the respective lengths of the kite connecting lines to steer the kite in flight and can be located in a ground base or in a "gondola", control pod, or kite control unit suspended below a kite, and can include moving tether attachment points, servo tabs, or rudders or any other known means to influence the aerodynamic properties of the kite, located at the kite itself for controlling the flight of the kite.

According to the invention there is provided a control device for controlling a kite steering arrangement which includes: a base including a lower base portion and an upper frame portion; a control bar support between the lower base portion and the upper frame portion; a control bar pivot point mounted displaceably about the control bar support for pivotally supporting a control bar, when in use; a pair of interconnecting members extending inbetween opposing end regions of the control bar and the upper frame portion, wherein the length aspect of the interconnecting members is adjusted by pivoting the control bar about the control bar pivot point and/or by displacement of the control bar pivot point relative the control bar support; a tensioning mechanism for tensioning the interconnecting members so as to exert a pulling force on the control bar; a base pivot point for allowing pivoting of the base about a horizontal axis thereof; a base rotator for allowing rotation of the base about a vertical axis thereof; a manipulator for manipulating the base pivot point and base rotator for aligning the control device with the positional orientation of the kite, and/or kite connecting lines, when in use; and a communicator, for when in use, communicating adjustment of the interconnecting members to the kite steering arrangement for adjusting the kite connecting lines and/or actuators at the kite accordingly.

The base may be mounted onto a rotatable platform and may include a lower base portion and an upper frame portion, the base pivot point pivotally interconnecting the lower base portion and the upper frame portion.

The control bar support may include stopper formations for limiting the degree of upper and/or lower displacement of the control bar relative the control bar support.

The stopper formations may be arranged displaceably relative the control bar support.

The pair of interconnecting members may be selected from any one or more of lines, cables, or the like, and may extend from opposing upper end regions of the frame.

The tensioning mechanism may be supported by the lower base portion and may include any one or more of reels, guides, pulley wheels, sheaves, piston cylinders, linear actuators, toothed wheels and a chain or a belt, or a combination thereof, operatively interconnected by the interconnecting members.

The tensioning mechanism may be supported by the upper frame portion and may include any one or more of reels, guides, pulley wheels, sheaves, piston cylinders, linear actuators, toothed wheels and a chain or a belt, or a combination thereof, operatively interconnected by the interconnecting members.

The tensioning mechanism may be configured to measure the degree of adjustment of the length aspect of the interconnecting members.

The tensioning mechanism may be configured to measure the relative length aspect of the interconnecting members extending between the frame and the control bar, while manipulating the interconnecting members with a propensity to decrease the length aspects thereof.

The tensioning mechanism may be configured to adjust the degree of tensioning on the control bar.

The tensioning mechanism may comprise of reels and/or linear actuators for simultaneously manipulating and measuring their length aspects. The reels and/or linear actuators may be driven by an electro motor, a hydraulic pump and/or pneumatic pump in combination with a hydraulic or pneumatic actuator, such as a hydraulic or pneumatic motor or a hydraulic cylinder. The linear actuators may be in the form of cylinders, electrically driven by worm gears, threaded rods or a ball screw, or may comprise of cog-wheel driven chains, belts or ropes, moving up and down back and forth for manipulating the length of the interconnecting members.

The tensioning mechanism may include a linear cylinder and/or an electro motor operatively connected to a toothed chain or belt. In use, a pully may be mounted onto the toothed chain or belt, which pulley is in turn operatively connected to the interconnecting member. Tensioning and/or displacement of the interconnecting member is facilitated by displacement of the pulley, caused when moving the toothed chain or belt upon activation of the electro motor or linear cylinder.

The base pivot point may include a toothed surface operatively connected to a gear for pivoting the upper frame type element relative the lower base portion when rotating the gear relative the toothed surface.

The base rotator may include a toothed surface defined about an outer or inner surface of the base portion, operatively connected to its own gear for rotating the base portion about a vertical axis thereof upon rotation of the gear.

The manipulator may be in the form of a driven motor for driving the base pivot point and/or base rotator.

The manipulator may include sensory feedback from any one or more of the kite, kite connecting lines, and kite steering arrangement to manipulate the base pivot point so as to pivot the frame type element in alignment with the spatial orientation of the kite in space and/or to mimic the trajectory of the kite connecting lines extending between the kite steering arrangement and the kite.

The manipulator may include sensory feedback from any one or more of the kite, kite connecting lines, and kite steering arrangement to rotate the base rotator so as to align the control device with the spatial orientation of the kite in space and/or to mimic the trajectory of the kite connecting lines extending between the kite steering arrangement and the kite.

In use, the spatial orientation of the kite in space may be measured by any suitable means, for instance by an optical signal from the kite, a radar signal, or an acoustical/sonar signal from the kite, possibly by reflecting such a signal sent from the ground base with a suitable device mounted at the kite.

The spatial orientation may also be measured by a GPS sensor, mounted at the kite, which may be complemented by a gyroscope sensor to measure the kite's orientation in space and its change of orientation in space.

The kite connecting lines' orientation in space may be measured by any suitable means, for instance by potentiometers attached to mechanical sensors, which are deflected by kite connecting lines or by the suspension of the kite steering arrangement itself.

The communicator may include a computer and transmitter.

The communicator may cause the kite steering arrangement adjusting the respective lengths of the kite connecting lines by effecting one or more kite line length adjusters of the kite steering arrangement.

The kite line length adjusters may comprise reels, winches, linear actuators, linear cylinders, drive belts or chains, deflectors and or any other suitable mechanic device for adjusting the operational length of the one or more kite connecting lines and/or actuators at the kite.

The communicator may cause adjustment of the location, or movement of the attachment point, of the kite connecting lines extending from the kite.

The communicator may result in the kite steering arrangement adjusting actuators, rudders, elevators, ailerons, or servo tabs located at the kite itself, by effecting one or more kite line length adjusters of the kite steering arrangement.

The control device may be configured to adjust the differential length of the pair of interconnecting members.

The control device may be configured to adjust the degree of pivoting about the horizontal axis thereof.

The control device may be configured to adjust the degree of rotation of the base rotator about the vertical axis thereof.

The control device may include a display for displaying the actual tensional forces experienced by the kite connecting lines.

The control device may include a display for displaying the length of the kite connecting lines extending between the kite steering arrangement and the kite.

The control device may include a translator adjuster for adjusting the effect of the degree of pivoting and/or displacement of the control bar relative the control bar support on the kite steering arrangement.

The control device may include a kite connecting line adjuster for individually adjusting the respective lengths of the kite connecting lines extending between the kite steering arrangement and the kite.

The control device may include an inverter for inverse translating the left/right pivoting of the control bar relative the control bar mounting.

The control device may include a rating and/or recording system, where a user can rate flight manoeuvres and where these ratings, together with positioning and/or orientation data of the kite, and/or tension data of the kite connecting lines, and/or the steering inputs of the user at the control device, are recorded.

BRIEF DESCRIPTION OF DRAWINGS

The invention will now be described, by way of non-limiting examples, with reference to the accompanying drawings.

In the drawings.

DETAILED DESCRIPTION

Figure 1:
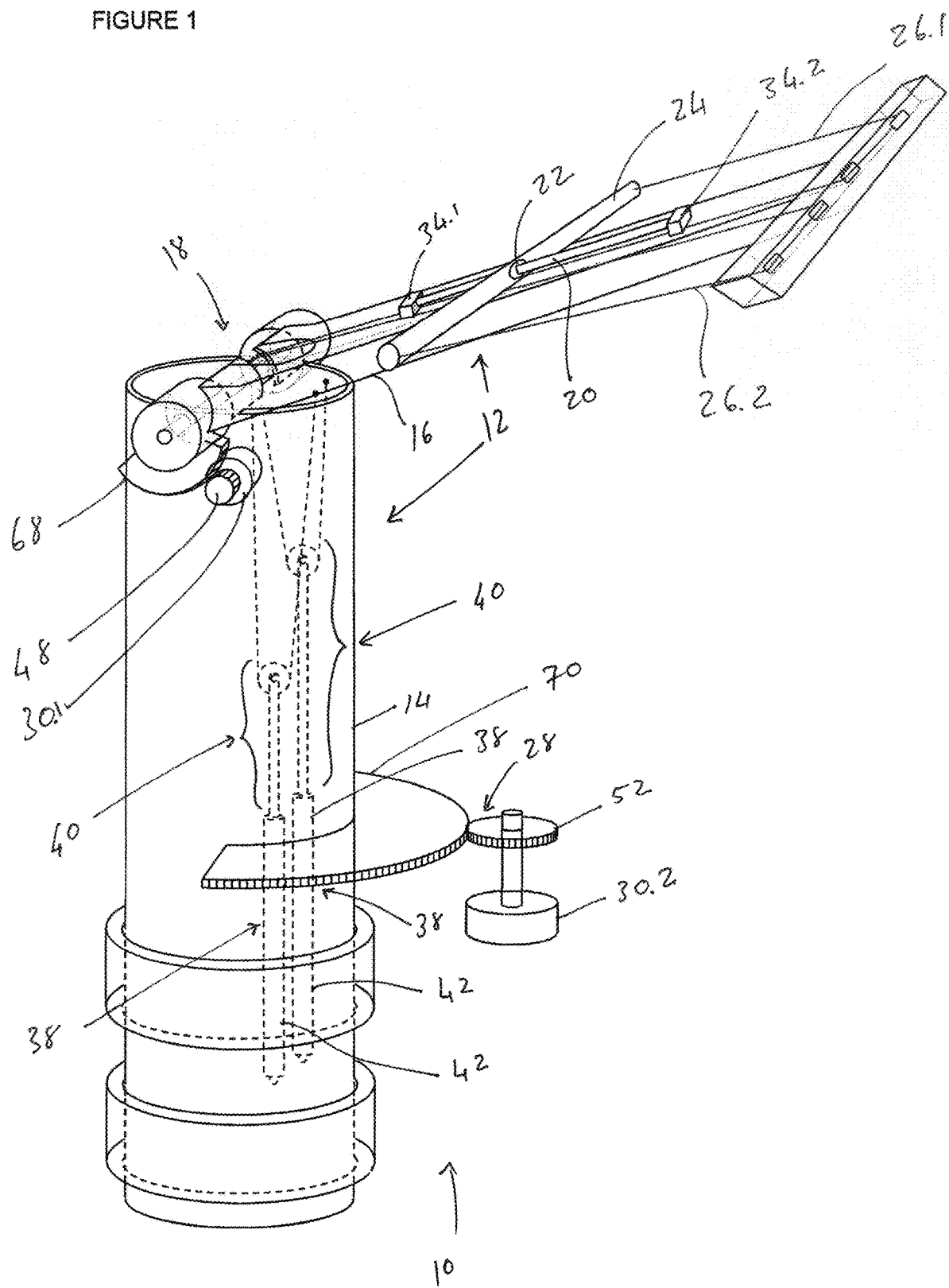
FIG. 1 shows a perspective view of the control device.

Referring now to the drawings, the control device in accordance with the invention is generally indicated by reference numeral 10.

According to an embodiment of the invention there is provided a control device 10 for controlling a kite steering arrangement (not shown) which includes a base 12 comprising a lower base portion 14 and an upper frame portion 16, pivotally interconnected by a base pivot point 18 for allowing the upper frame portion 16 to pivot about a horizontal axis relative the lower base portion 14, a control bar support 20 extending downward the upper frame portion 16, a control bar pivot point 22 mounted displaceably about the control bar support 20 for pivotally supporting a control bar 24, when in use, a pair of interconnecting members 26.1 and 26.2, extending inbetween opposing end regions of the control bar 24 and the upper frame portion 16, wherein the length aspect of the pair of interconnecting members 26.1 and 26.2 is adjusted by pivoting the control bar 24 about the control bar pivot point 22 and/or by displacement of the control bar pivot point 22 relative the control bar support 20, a tensioning mechanism for tensioning the interconnecting members 26.1 and 26.2 so as to exert a pulling force on the control bar 24, a base rotator 28 for allowing rotation of the base 12 about a vertical axis thereof, a manipulator, typically in the form of driven motors 30.1 and 30.2 manipulates pivot gear 48 and rotator gear 52, respectively, so as to align the base pivot point 18 and base rotator 28 of the control device 10 with the positional orientation of the kite (not shown), and/or kite connecting lines (not shown), when in use and a communicator (not shown) for, when in use, communicating adjustment of each of the interconnecting members 26.1 and 26.2, to the kite steering arrangement (not shown) for adjusting the kite connecting lines (not shown) accordingly.

The base 12 can be mounted onto a rotatable platform 32 so as to allow rotation about a vertical axis thereof.

The control bar support 20 can include a pair of stopper formations 34.1 and 34.2, for limiting the degree of upper and/or lower displacement of the control bar 24 relative the control bar support 20.

The control bar support 20 in turn can be manufactured from any suitable material.

Figure 7:
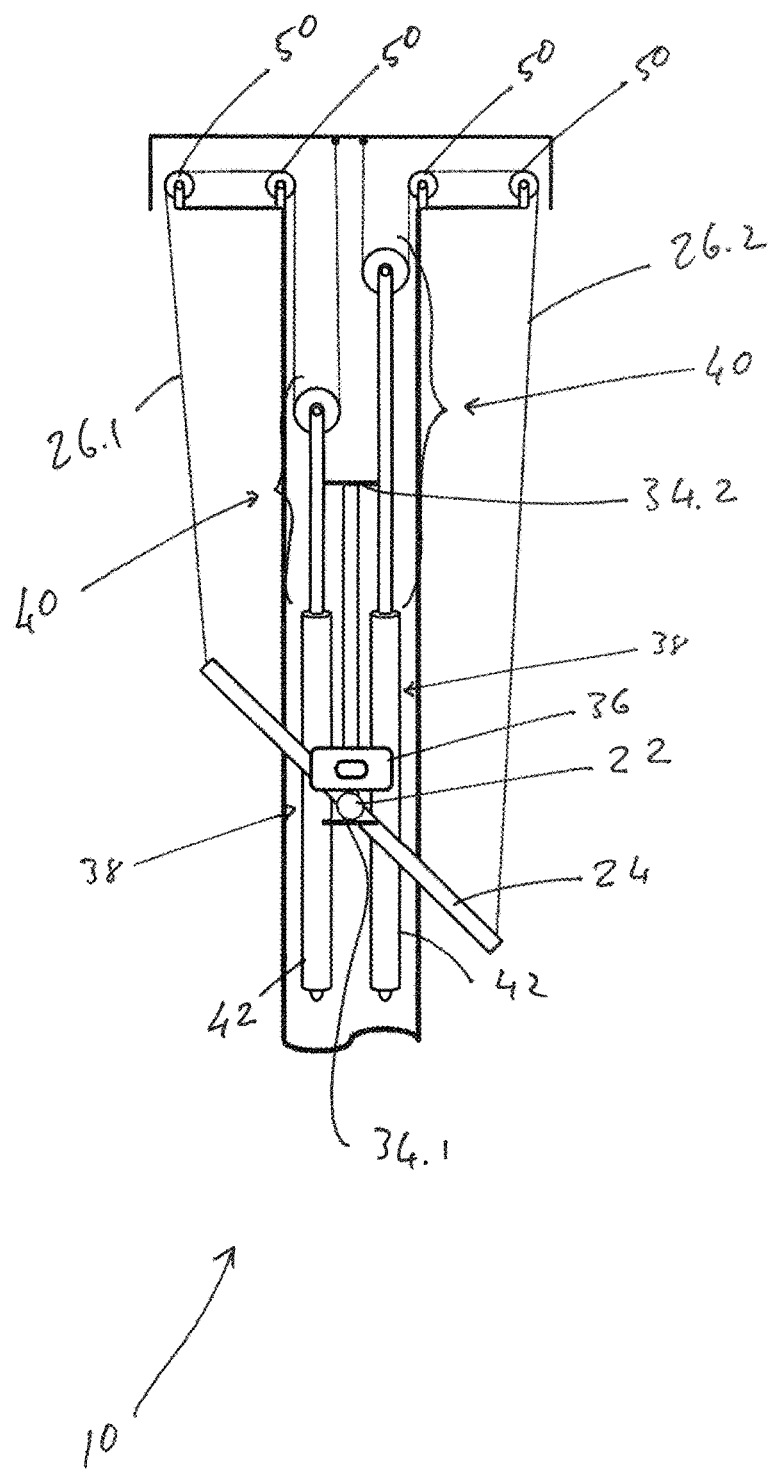
FIG. 7 is a schematic illustrating a configuration of the tensioning mechanism and pair of interconnecting members.
Figure 15:
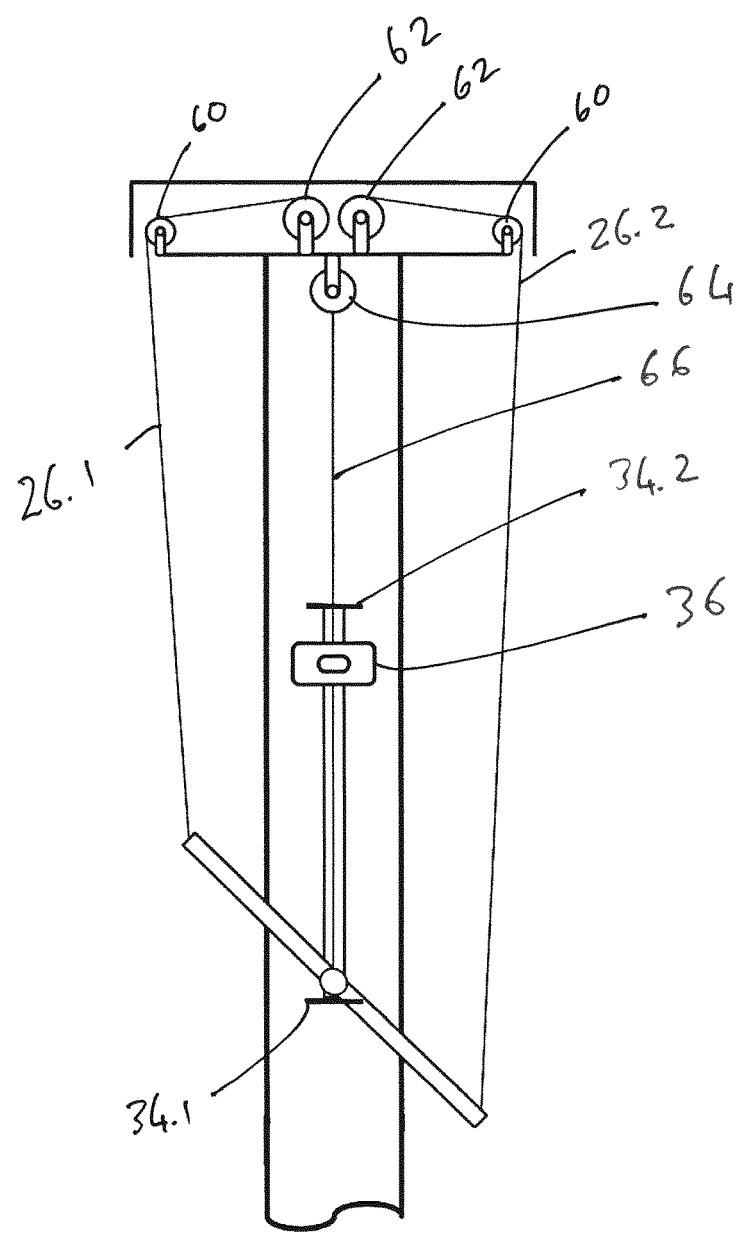
FIGS. 15 and 16 are schematics illustrating the adjustment of the pair of interconnecting members by pivoting the control bar about the control bar pivot point, or by translationally moving the control bar.
Figure 16:
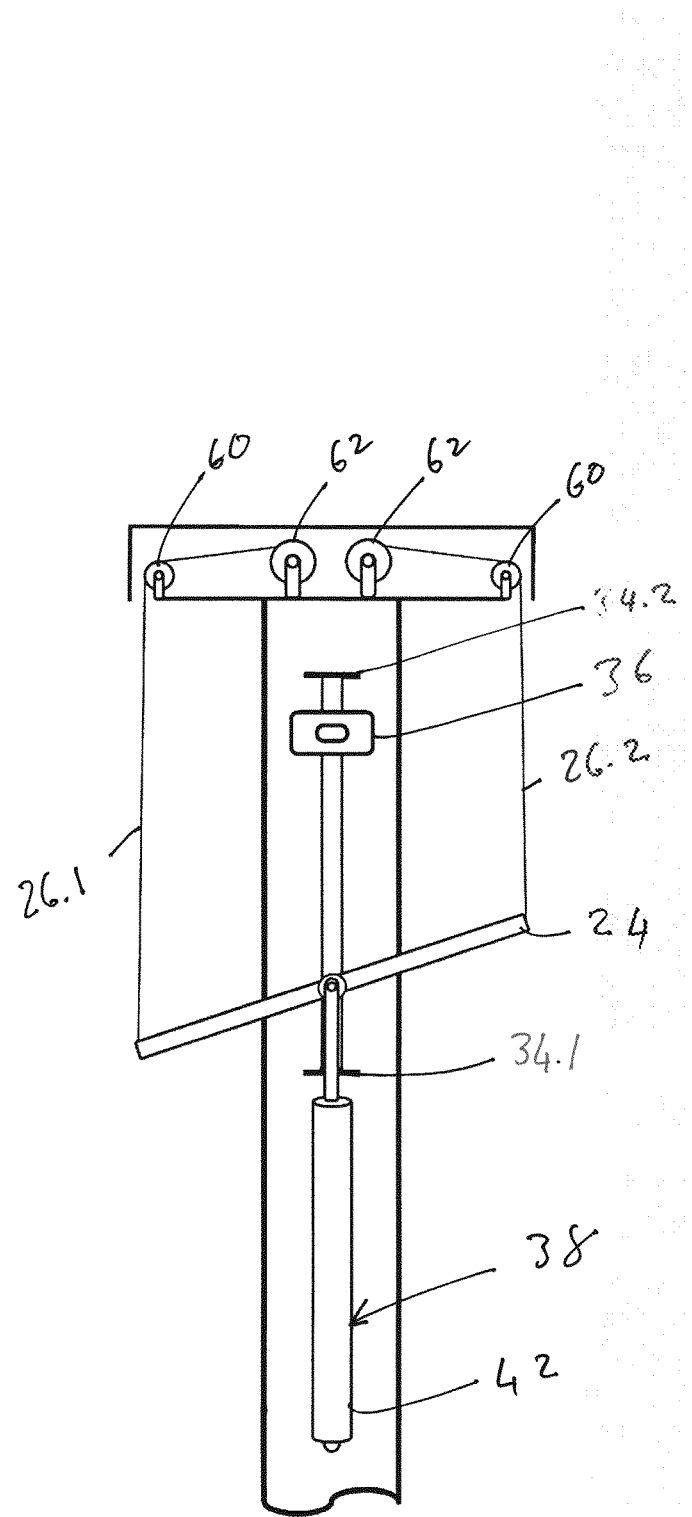

An additional adjustable stopper formation 36, more clearly shown in FIGS. 7, 15 and 16, can also be added to alternate the degree of possible displacement of the control bar 24 relative the control bar support 20.

The pair of interconnecting members 26 can be selected from any one or more of lines, cables, or the like, and may extend from opposing upper end regions of the frame type element 16 towards the control bar 24.

The tensioning mechanism can be supported by lower base portion 14 or upper frame portion 16 and can include any one or more of reels, guides, pulley wheels, sheaves, piston cylinders, linear actuators, toothed wheels and a chain or belt, or a combination thereof, operatively interconnected by the interconnecting members 26.1 and 26.2.

Depicted in FIGS. 1 and 7 the tensioning mechanism is in the form of a piston cylinder 38 comprising a rod and pulley arrangement 40 operatively connected to the interconnecting members 26.1 and 26.2, extending from a cylinder base 42. Adjustment and tensioning of interconnecting members 26.1 and 26.2 is facilitated upon displacement of the rod and pulley arrangement 40 relative the cylinder base 42. Any number of piston cylinders can be added and orientated in any preferred manner so as to adjust the lengths of the interconnecting members upon deflection of the interconnecting members.

Depicted in FIGS. 2, 3, 4 and 8, the tensioning mechanism can also comprise a toothed rod 44 and gear 46 arrangement, the toothed rod 44 including a pulley operatively connected to interconnecting member 26.1 and whereby tensioning and/or displacement of the interconnecting member 26.1 is facilitated by rotation of the gear 46 relative the toothed rod 44.

Figure 2:
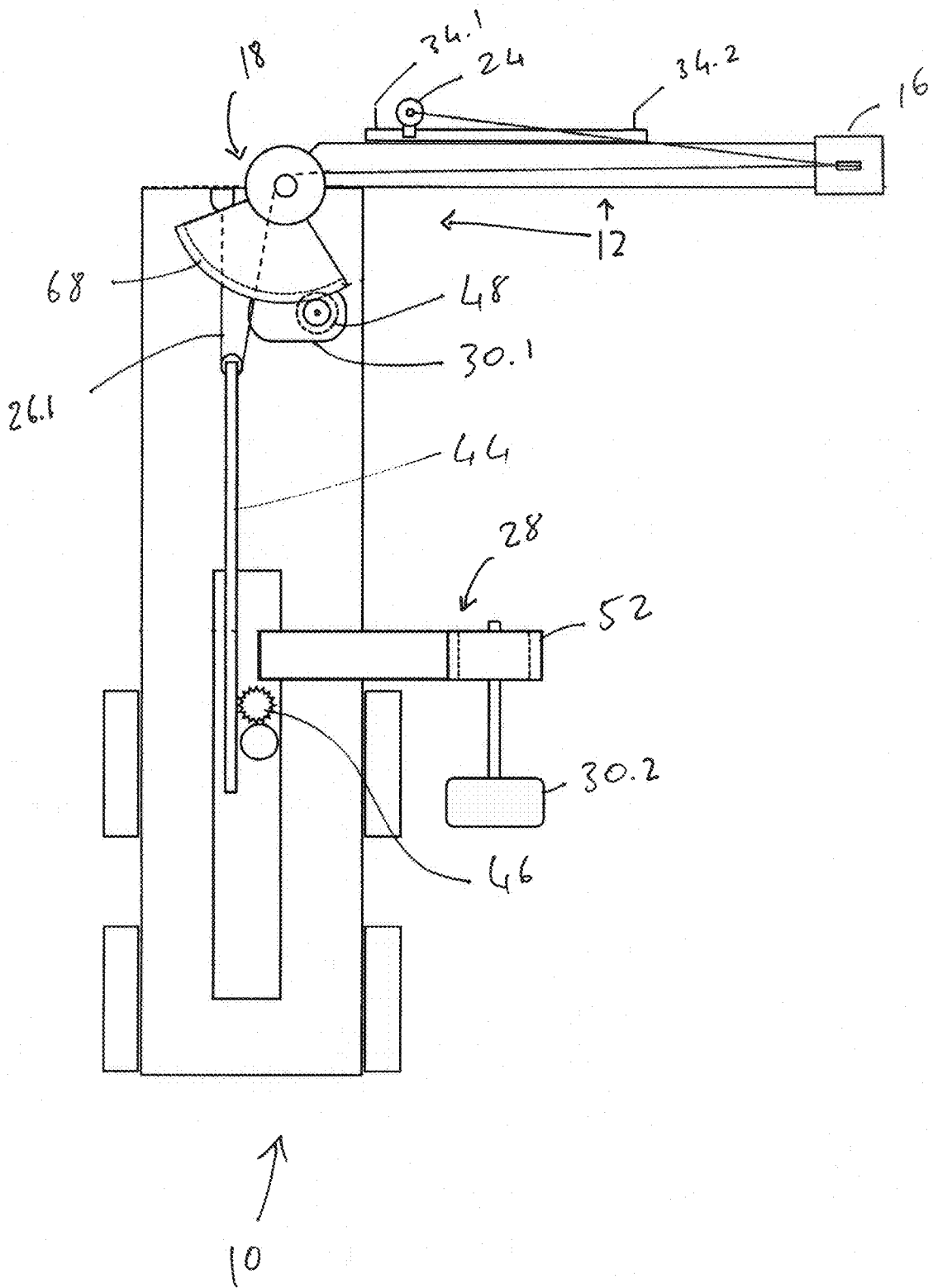
FIGS. 2 to 4 are side views of the control device shown in FIG. 1 illustrating different states and/or configurations of the base pivot point, the base rotator, the control bar pivot point, and the tensioning mechanism, respectively.
Figure 3:
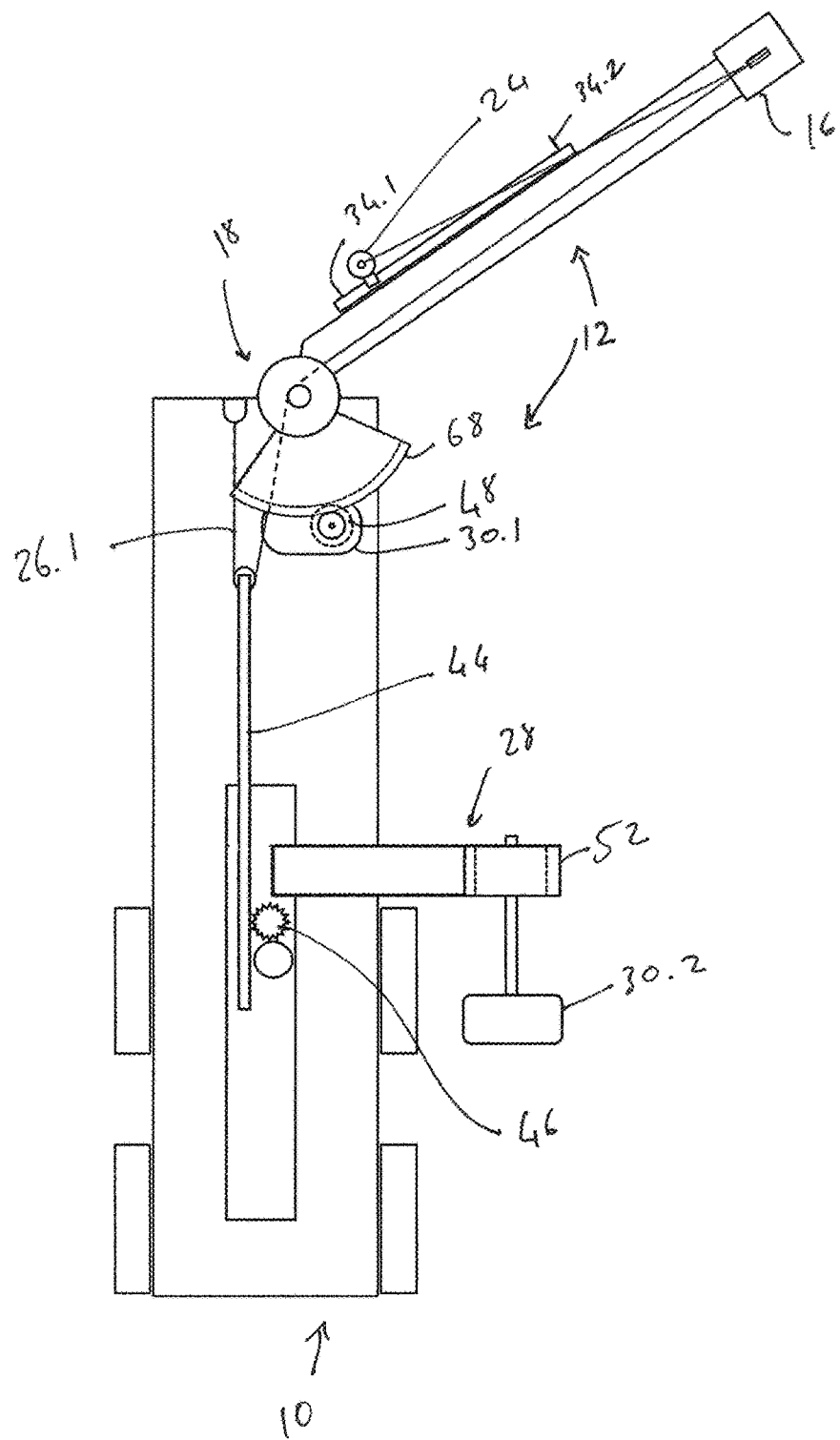

FIGS. 2 and 3 shows the different pivoting orientations of the upper frame portion 16 relative lower base portion 14 as a result of the pivoting about base pivot point 18 driven by pivot gear 48.

Figure 4:
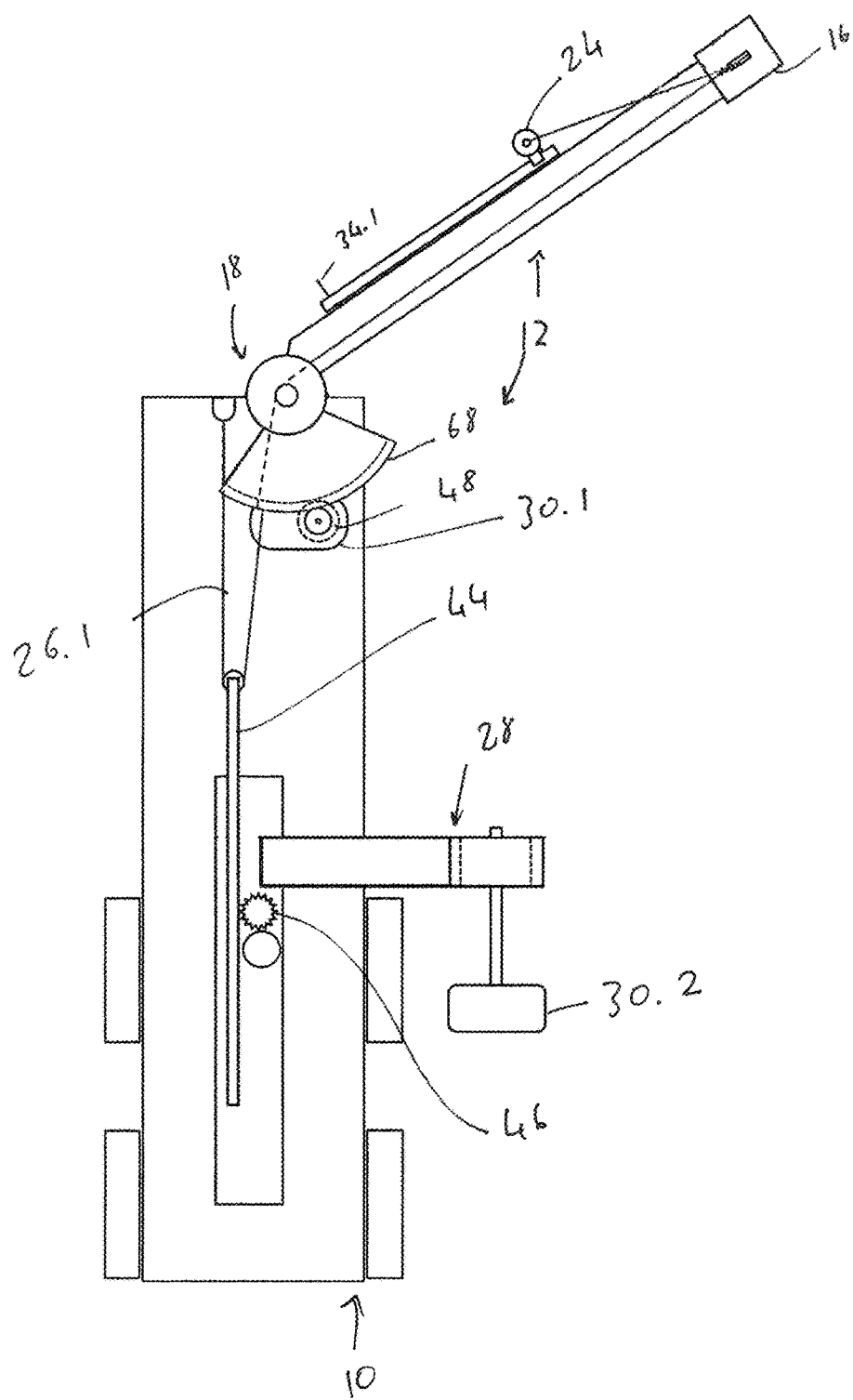

FIG. 3 shows the control bar 24 when positioned near the lower stopper 34.1, and FIG. 4 shows the control bar 24 when displaced towards the upper stopper formation 34.2.

Figure 5:
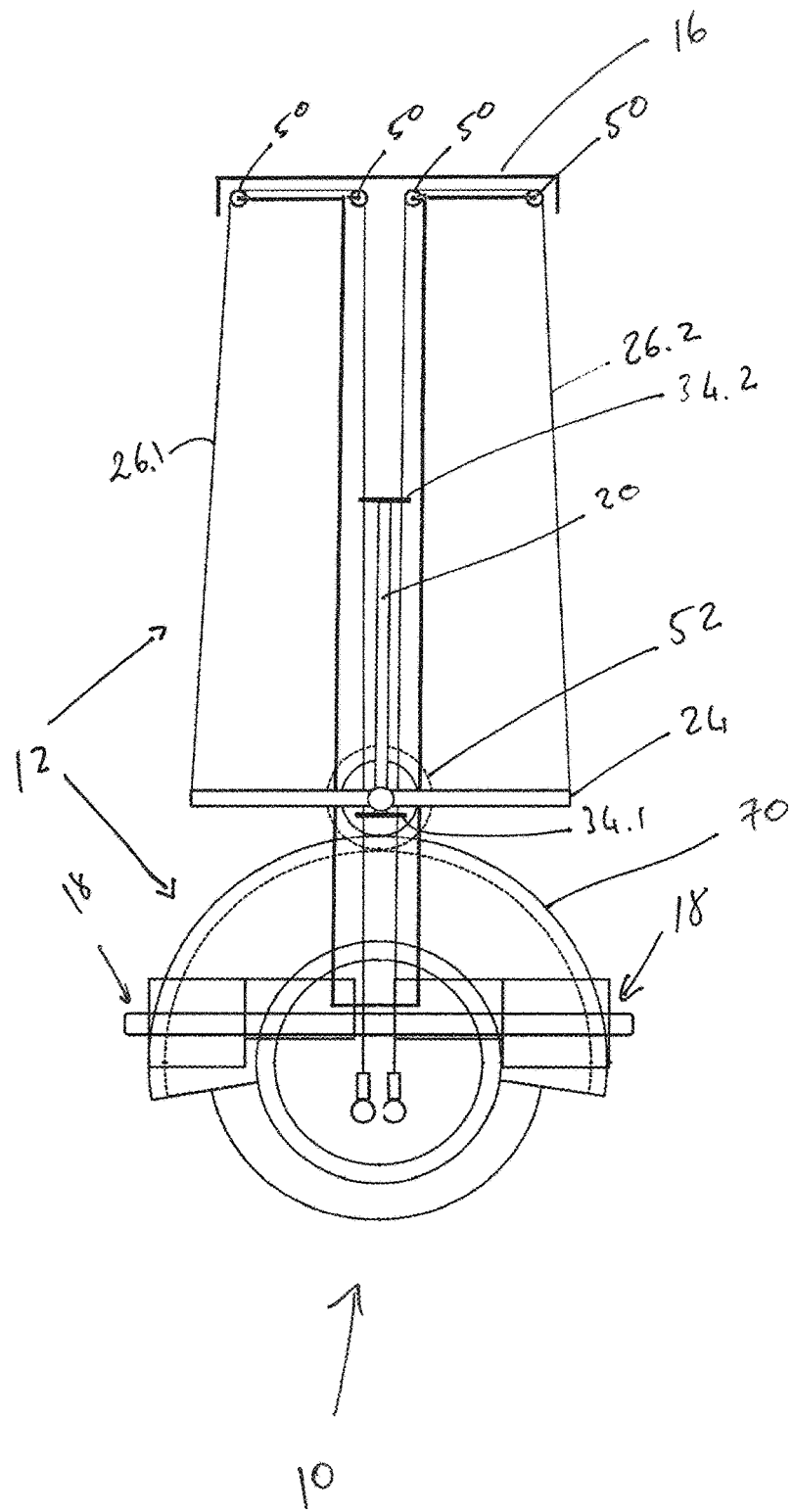
FIGS. 5 and 6 are a top views of the control device shown in FIGS. 1 to 4.

FIG. 5 shows a top view of FIG. 3 more clearly illustrating the position of the control bar 24 when in the lower position relative the control bar support 20, near and or in abutment with lower stopper formation 34.1.

FIG. 5 also illustrates one possible arrangement of interconnecting members 26.1 and 26.2 about the upper frame portion 16 where frame mounted pulleys 50 direct the path of the interconnecting members 26.1 and 26.2.

Figure 6:
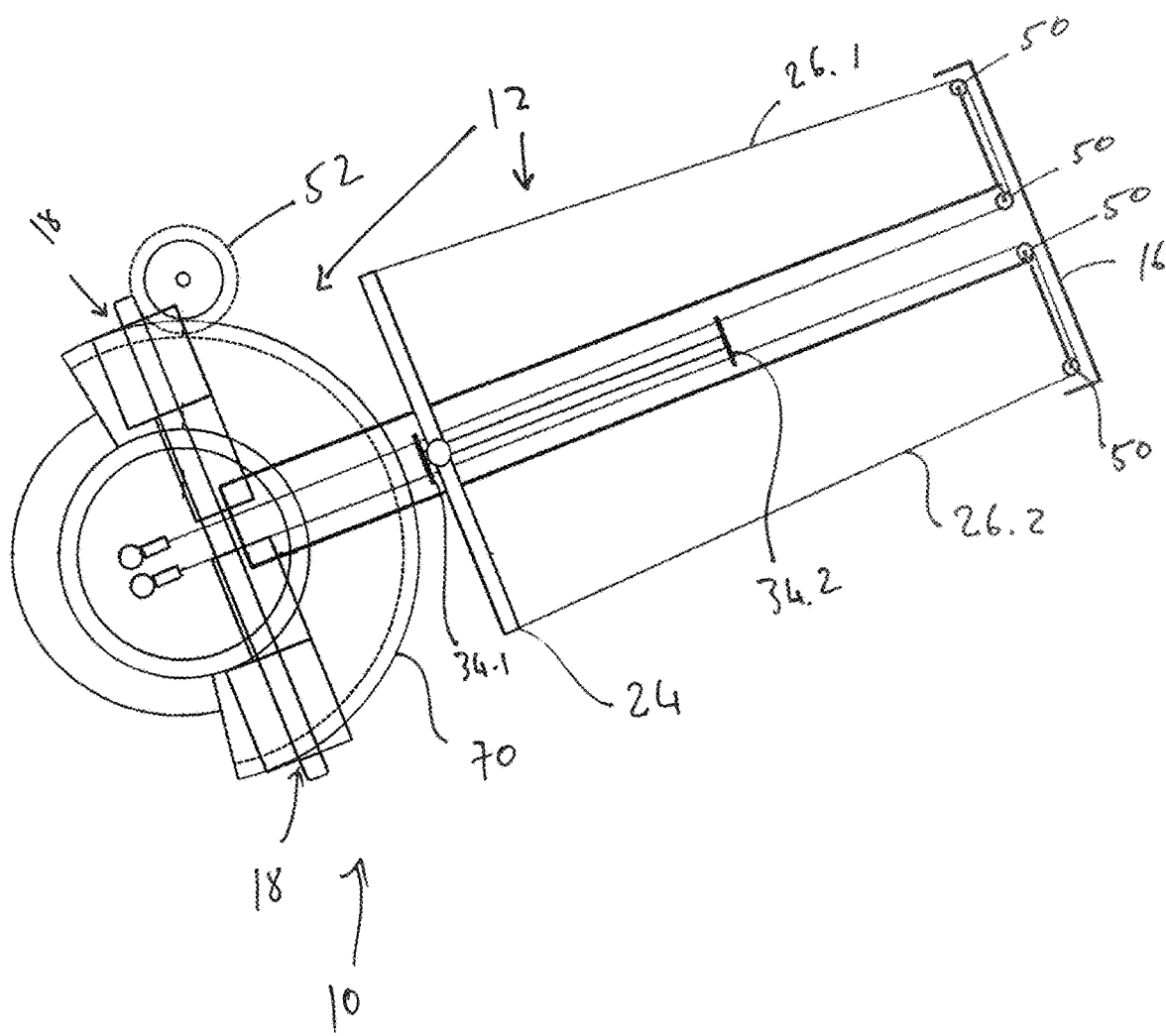

FIG. 6 illustrates the upper frame portion 16 shown in FIG. 5 rotated about a vertical axis effected by rotator gear 52.

FIG. 7 also depicts another possible configuration of the tensioning mechanism incorporating piston cylinders 38 mounted about the upper frame portion 16, as well as the inclusion of an additional adjustable stopper formation 36 located inbetween the pair of spaced apart stopper formations 34.1 and 34.2, where the pair of stopper formations 34.1 and 34.2 is fixed to the control bar support 20, and adjustable stopper formation 36 is located therebetween. The adjustability of stopper formation 36 allows a user to adjust the degree of displacement of the control bar 24 relative control bar support 20.

Figure 8:
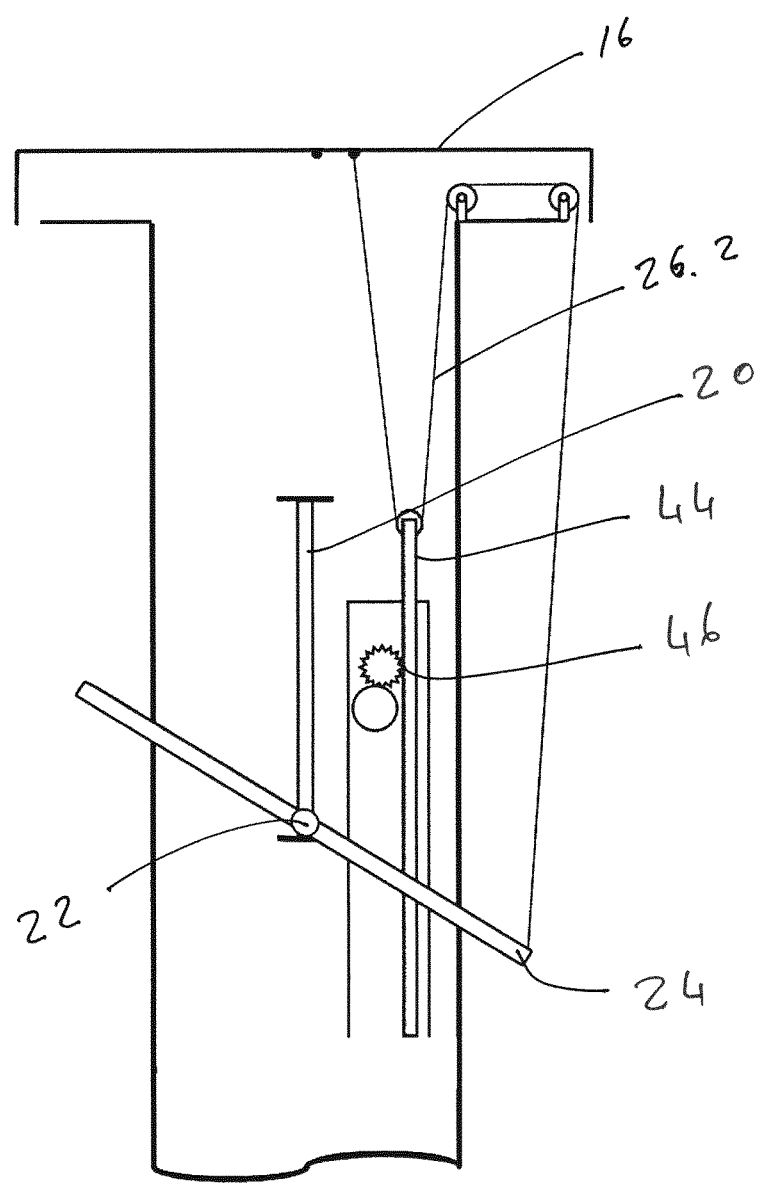
FIG. 8 is a schematic illustrating another configuration of the tensioning mechanism and pair of interconnecting members.

FIG. 8 illustrates another configuration of the tensioning mechanism with a piston cylinder. Usually a pair of piston cylinders will be incorporated but only the right-hand sided piston cylinder is included in this illustration. Driven cogwheel and/or gear 46 is interconnected with toothed piston rod 44, with a sheave attached to it, through which interconnecting member 26.2 is guided. Displacement of piston rod 44 in turn shortens or lengthens interconnecting member 26.2. The pull of the pilot at the bar 24 downwards, or angling of the bar to the right, will pull the piston rod 44 upwards, while this movement is measured, e.g. by the driving element, for instance an electro motor, or by other known means. Driven cogwheel 46 has a propensity to pull down piston rod 44, and hence to shorten the interconnecting member 26.2 and therefore pull up the bar 24, but this drive is not self-inhibiting and its force can be overcome by the pilot's manual pull. (The left-hand side works accordingly.)

Figure 9:
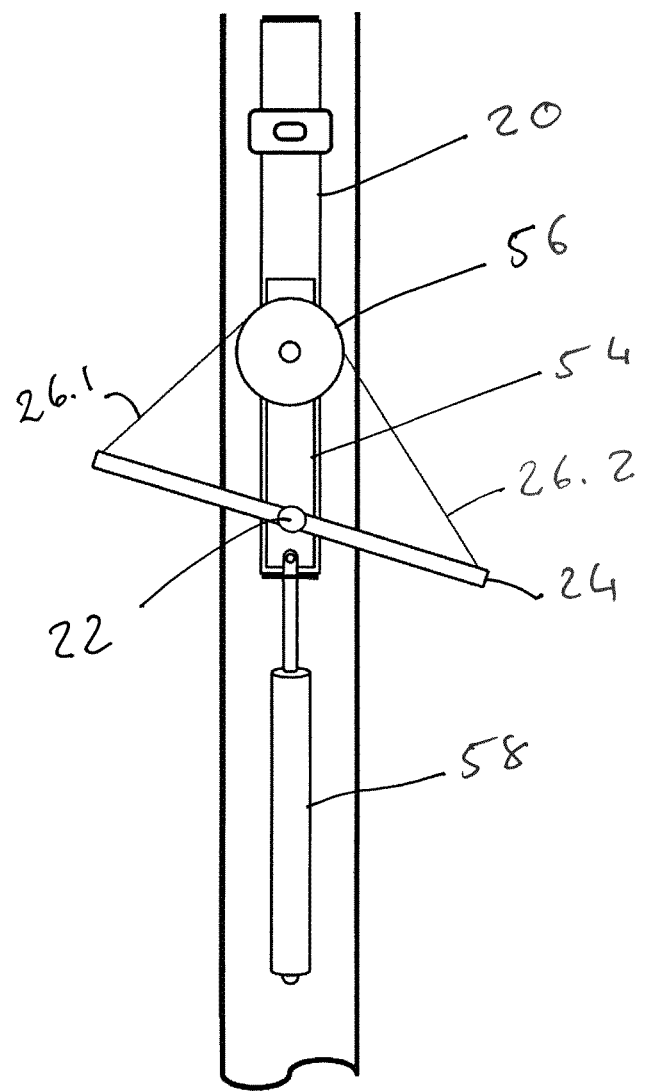
FIG. 9 is a schematic illustrating a further configuration of the tensioning mechanism and pair of interconnecting members.
Figure 10:
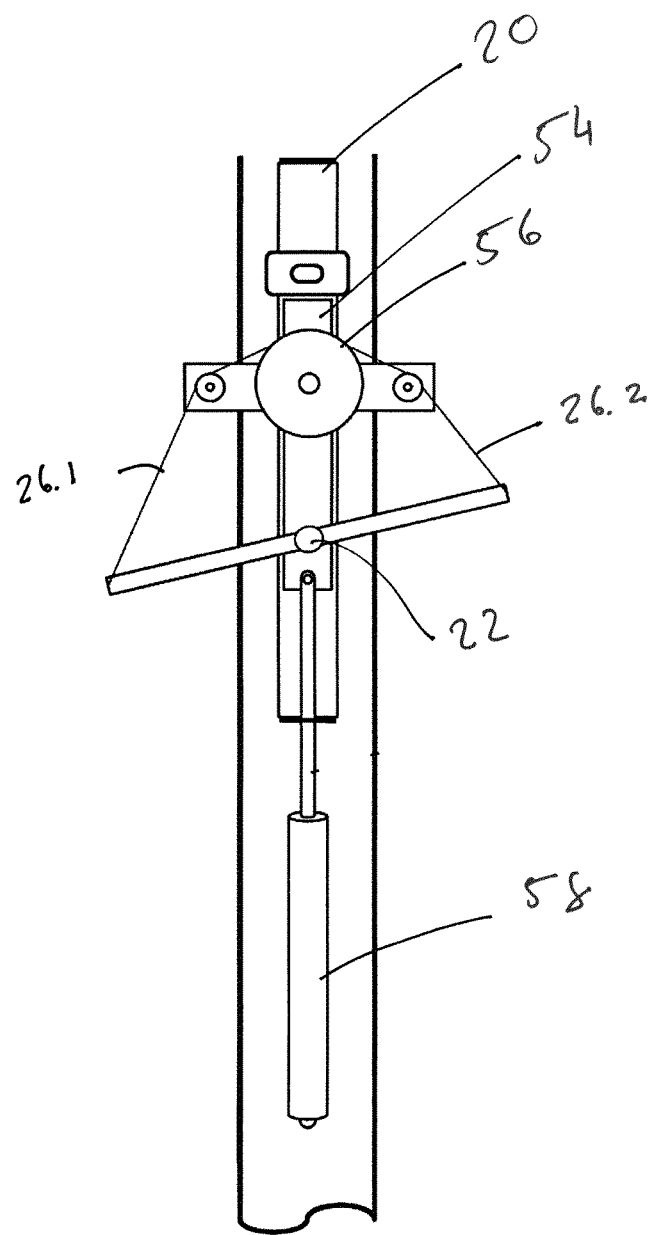
FIG. 10 is a schematic illustrating yet another configuration of the tensioning mechanism and pair of interconnecting members.
Figure 11:
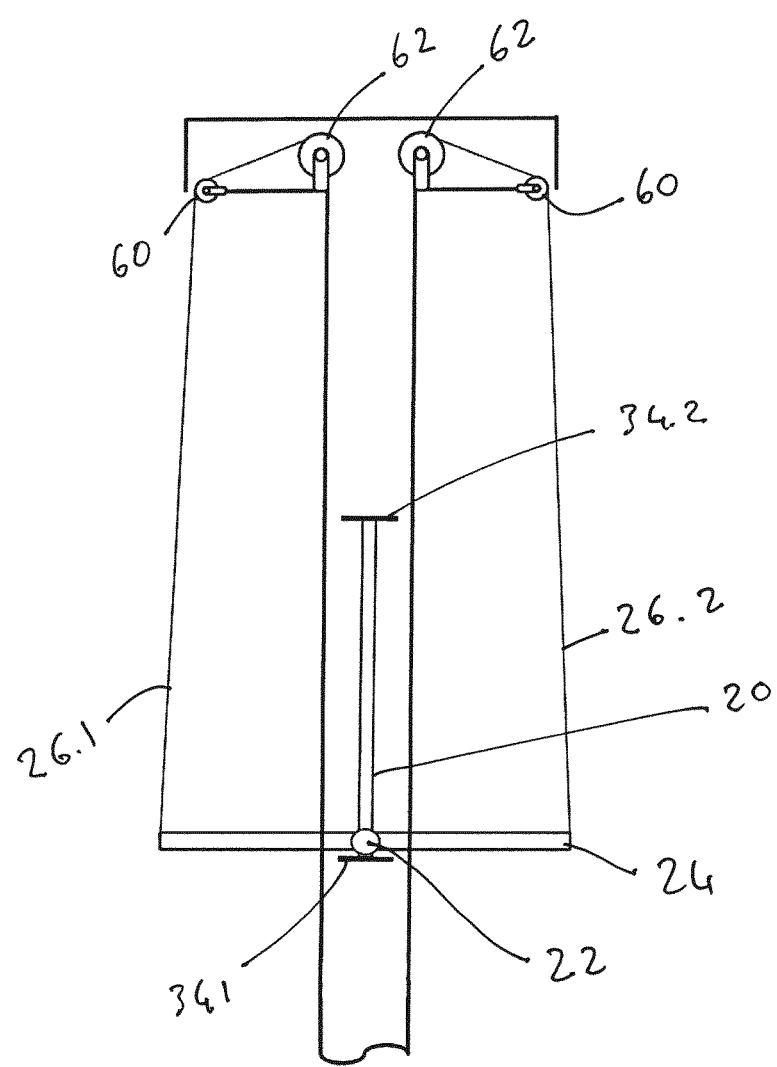
FIGS. 11 to 14 are schematics of yet a further configuration of the tensioning mechanism and pair of interconnecting members.
Figure 12:
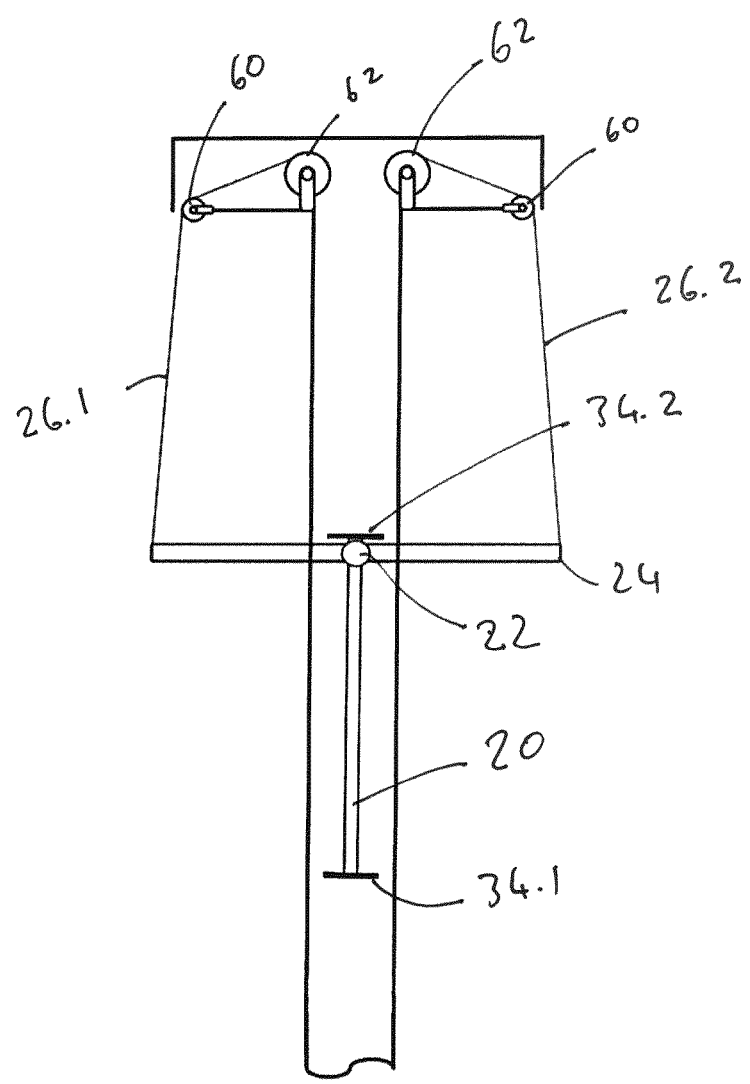
Figure 13:
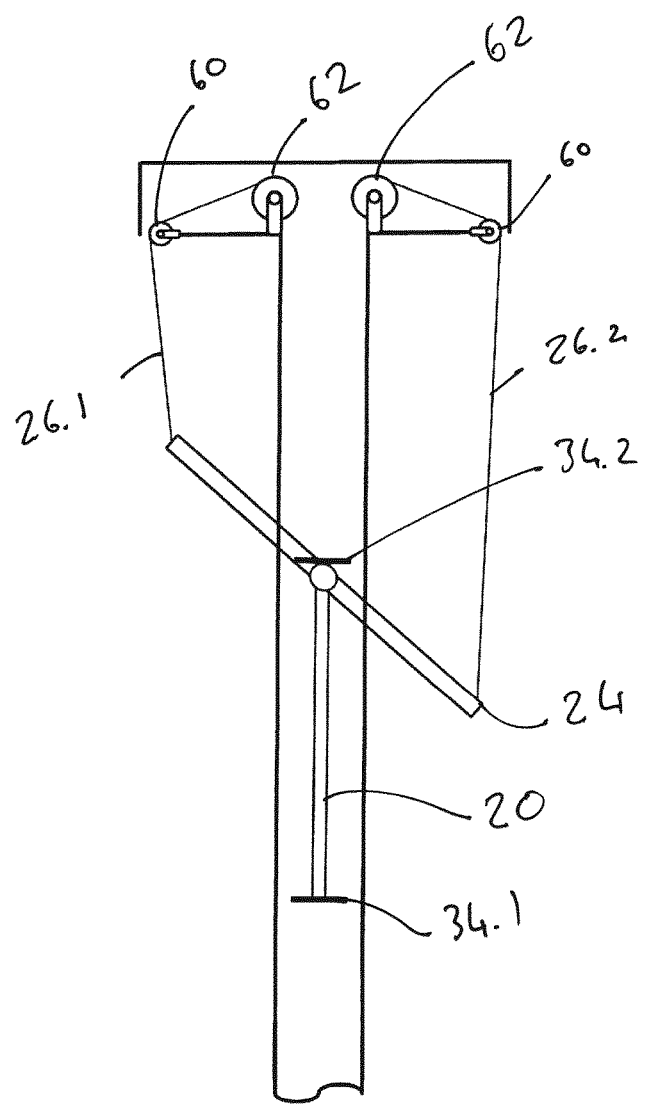
Figure 14:
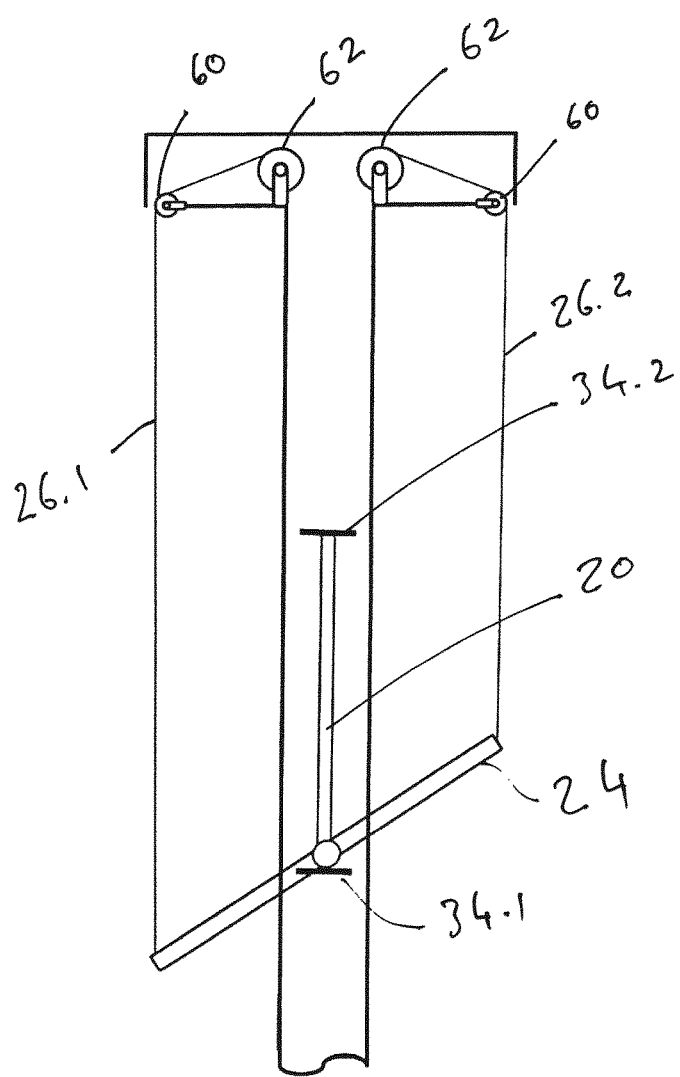

More clearly shown in FIGS. 9 and 10, the control bar support 20 can also include an additional mounting 54 slidably mounted on the control bar support 20, the mounting 54 including a rotatable wheel 56 with the interconnecting members 26.1 and 26.2 extending over the wheel 56 and connected to opposing end regions of control bar 20. Rotatable wheel 56 measures deflection of control bar 24 to the left or the right. In this embodiment the tensioning mechanism in the form of cylinder 58 exerts a pushing force on the control bar 24.

Turning now to FIGS. 11 to 14 depicting yet a further embodiment of the tensioning mechanism. The pilot can shift the control bar 24 on control bar support 20 upwards and downwards, until it reaches its upper stopper 34.2 or lower stopper 34.1. The pilot can displace control bar 24 around control bar pivot point 22 and angle it towards the left or the right. These movements of control bar 24 lengthens or shortens interconnecting members 26.1 and 26.2, which are diverted by a system of pullies 60, towards the reels 62, which roll up interconnecting members 26.1 and 26.2, upon rotation thereof. Reels 62 can be driven by motors, either electric, hydraulic, pneumatic or other. In use, reels 62 will have the propensity to roll up and or shorten interconnecting members 26.1 and 26.2, exerting a constant pulling force on the interconnecting members 26.1 and 26.2, pulling the control bar 24 upwards.

This roll-up force is thereby proportional to the forces on the ropes from an actuator system, which ultimately steers the kite, typically extending from winches to the kite or from a gondola to the kite. This magnitude of this upward pulling force will be such that it will be overcome by the pilot when pulling the control bar 24 downwards, manually, which results to reeling out of interconnecting members 26.1 and 26.2, from reels 62. The reels 62 further contain sensors for measuring length of each of the interconnecting members 26.1 and 26.2 reeled out and spanning between reel 62 and control bar 24. The result is transmitted to a central control unit (not shown) for the purpose to control the actuator system and thereby to control and to steer the kite.

Depicted in FIG. 15, the tensioning mechanism can also be in the form of a reel 64 and rope 66 arrangement wherein reel 64 is rotatably mounted on upper frame portion 16 and exerts a pulling force on rope 66 when rotating resembling the forces exerted on the kite connecting lines by the kite, when in use.

FIG. 16 illustrates yet a further configuration of the combination of tensioning mechanism in the form of piston cylinder 38 exerting a pushing force on control bar 24 and the guidance of the interconnecting members 26.1 and 26.2 about the frame mounted pulleys 60.

Figure 17:
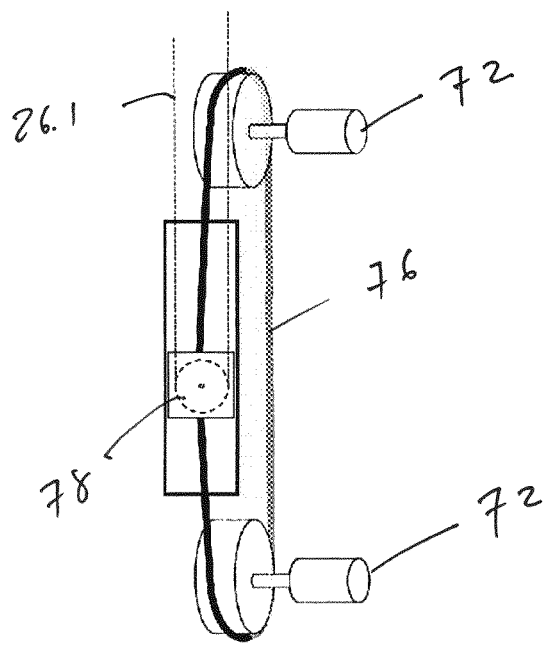
FIGS. 17 and 18 are schematics illustrating another configuration of the tensioning mechanism.
Figure 18:
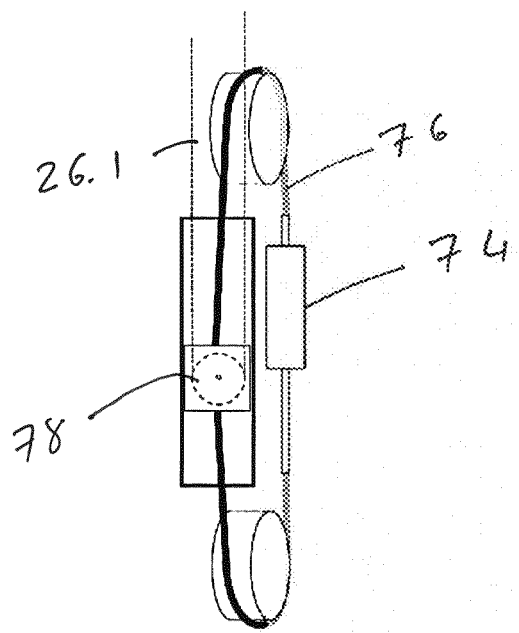

FIGS. 17 and 18 show yet two further embodiments of the tensioning mechanism.

The tensioning mechanism can also include an electro motor 72, FIG. 17, or a linear cylinder 74, see FIG. 18, operatively connected to a toothed chain or belt 76.

In use, pully 78 will be mounted onto the toothed chain or belt 76, which pulley 78 is in turn operatively connected to one interconnecting member, for example 26.1. Tensioning and/or displacement of one of the interconnecting member 26.1 is facilitated by displacement of the pulley 78, caused when moving the toothed chain or belt 76 upon activation of the electro motor 72 or linear cylinder 74.

In order to promote controllability and manoeuvrability the tensioning mechanism will be configured to adjust the degree of tensioning on the control bar 24.

FIGS. 1, 2, 3 and 4 illustrates the base pivot point 18 which includes toothed surface 68 operatively connected to a pivot gear 48 for pivoting the upper frame portion 16 relative the lower base portion 14 upon rotation thereof. The base rotator 28 in turn includes a toothed surface 70 defined about an outer surface of the lower base portion 14, operatively connected to rotator gear 52 for rotating the base portion, and thereby the control device 10, about a vertical axis thereof upon rotation of rotator gear 52.

In use, the manipulator will be computerised and be adapted to include sensory feedback from any one or more of the kite, kite connecting lines, and kite steering arrangement so as to manipulate the base pivot point 18 so as to pivot upper frame portion 16 in alignment with the spatial orientation of the kite in space and/or to mimic the trajectory of the kite connecting lines extending between the kite steering arrangement and the kite.

The manipulator will also receive sensory feedback from any one or more of the kite, kite connecting lines, and kite steering arrangement to rotate the base rotator 28 so as to align the control device 10 with the spatial orientation of the kite in space and/or to mimic the trajectory of the kite connecting lines extending between the kite steering arrangement and the kite.

The manipulator in effect, by adapting the orientation of the control device 10 about its horizontal and vertical axis, will therefore provide a user of the control device 10 with a real time indication of the spatial orientation of the kite and the kite connecting lines.

The communicator will include a computer and transmitter to cause the kite steering arrangement adjusting the respective lengths of the kite connecting lines by effecting one or more kite line length adjusters of the kite steering arrangement.

The kite line length adjusters in turn, can comprise reels, winches, deflectors and or any other suitable mechanic device for adjusting the operational length of the one or more kite connecting lines.

In order to allow a user to steer the kite the communicator can cause adjustment of the location of the kite connecting lines extending from the kite, or movement of the attachment point, and/or result in the kite steering arrangement adjusting actuators, rudders, elevators, ailerons or servo tabs located at the kite itself, and/or by effecting one or more kite line length adjusters of the kite steering arrangement.

The control device can also be configured to adjust the differential length of the pair of interconnecting members, and, the degree of pivoting and/or rotation of the base about the vertical and/or the horizontal axis, respectively. For this purpose, or for any other inputs by the pilot, the control device may include additional input devices, such as sliders, control knobs, roll bars, slide controls, control sticks, joysticks, or the like, or such control elements may be displayed on a screen together with input devices, such as a keyboard, a mouse pointer, or a touch screen.

The control device can further also include a display for displaying the actual tensional forces experienced by the kite connecting lines, and, the length of the kite connecting lines extending between the kite steering arrangement and the kite, or displays for warning signals, if certain measures reach predetermined thresholds.

The control device can also include a translator adjuster for adjusting the effect of the degree of pivoting and/or displacement of the control bar relative the control bar support on the kite steering arrangement.

The control device can yet further also include a kite connecting line adjuster for adjusting the respective lengths of the kite connecting lines extending between the kite steering arrangement and the kite, an inverter for inverse translating the left/right pivoting of the control bar relative the control bar mounting, and, a rating and/or recording system, where a user can rate flight manoeuvres and where these ratings, together with the steering inputs of the user at the control device, are recorded. These data may be complemented by positioning data and/or orientation data of the kite, and/or tension data of the kite connecting lines, and recorded together with the rating and steering input data, for further analysis and to feed an artificial intelligence system with data for machine learning.

The invention gives a pilot additional and enhanced visual, sensory and haptic feedback about the kite (or kites) in the sky, and about the orientation and the movement of its kite connecting lines, or the kite itself.

This is of particular importance during times of less-than-perfect visibility, such as at night, in rain, snow, or fog, or in a combination of these.

But even during times of good visibility, or if one uses alternative means to feed back to the pilot the position and trajectory of the kite, such as for instance on a screen, the invention will help towards maximizing the traction forces of the kite, and therefore the kite's power, by further enabling the pilot to fly optimal trajectories in the respective wind conditions. The invention will further help to control the kite in difficult flight maneuvers or flight circumstances, and in difficult flight attitudes. These may for instance occur when the wind is weak, or turbulent, or during launching and landing of the kite, or when the wind is very strong, at or above the limit of the kite steering arrangement or kite suspension system.

It is the aim of the invention to enable the pilot to master such situations in the best possible way, and to maximize the power gained from the kite. The invention will also help to avoid kite crashes. It enables the pilot to control the kite in a most effective, efficient, precise, intuitive manner, and with minimum fatigue.

It is further an objective of the invention to build such a device small, slick and in an ergonomic design and manner.

The invention will also help to create an optimal input to train a computer or an artificial intelligence system to learn from the steering inputs of a human pilot's optimal flight maneuvers, and to provide an ideal data basis to optimize an artificial intelligence system. Such a computerized system can then later imitate or emulate the pilot's optimal steering inputs in various circumstances.

The invention claimed is:

1. A control device for controlling a kite steering arrangement, comprising:
    a base comprising a lower base portion and an upper frame portion;
    a control bar support extending between the lower base portion and the upper frame portion;
    a control bar pivot point mounted displaceably about the control bar support for pivotally supporting a control bar, when in use;
    a pair of interconnecting members extending inbetween opposing end regions of the control bar and the upper frame portion, wherein a length aspect of the interconnecting members is adjusted by:
      pivoting the control bar about the control bar pivot point; or
      by displacement of the control bar pivot point relative the control bar support;
    a tensioning mechanism that tensions the interconnecting members by exerting a pulling force on the control bar;
    a base pivot point that allows the upper frame portion to pivot about a horizontal axis relative to the lower base portion;
    a base rotator that allows rotation of the base about a vertical axis thereof;
    a manipulator that manipulates the base pivot point and base rotator, wherein the manipulator aligns the control device with a positional orientation of the kite or kite connecting lines; and a communicator that communicates adjustment of the interconnecting members to the kite steering arrangement, wherein the kite connecting lines or actuators at the kite are adjusted accordingly.

2. A control device as claimed in claim 1, wherein the base is mounted onto a rotatable platform.

3. A control device as claimed in claim 1, wherein the control bar support includes stopper formations that limit a degree of upper or lower displacement of the control bar relative the control bar support.

4. A control device as claimed in claim 3, wherein the stopper formations are mounted displaceably relative the control bar support.

5. A control device as claimed in claim 1, wherein the pair of interconnecting members comprises lines, ropes or cables.

6. A control device as claimed in claim 1, wherein the tensioning mechanism is supported by the upper frame portion.

7. A control device as claimed in claim 1, wherein the tensioning mechanism is configured to measure a degree of adjustment of a length aspect of the interconnecting members.

8. A control device as claimed in claim 1, wherein the tensioning mechanism is configured to measure length aspects of the interconnecting members extending between a frame and the control bar while the interconnecting members are manipulated, with a propensity to decrease the length aspects thereof.

9. A control device as claimed in claim 1, wherein the tensioning mechanism comprises:
 a linear cylinder or an electro-motor operatively connected to a toothed chain or belt; and
 a pulley mounted onto the toothed chain or belt, wherein the pulley is operatively connected to the interconnecting member.

10. A control device as claimed in claim 1, wherein the base pivot point comprises a toothed surface operatively connected to a gear that pivots the upper frame portion relative the lower base portion as the gear is rotated relative the toothed surface.

11. A control device as claimed in claim 1, wherein:
 the base rotator comprises a toothed surface defined about an outer or inner surface of a base portion; or
 the base rotator is operatively connected to a base rotator gear and rotates the base portion about a vertical axis thereof upon rotation of the gear.

12. A control device as claimed in claim 1, wherein the manipulator comprises a driven motor that drives the base pivot point or the base rotator.

13. A control device as claimed in claim 1, wherein:
 the manipulator comprises sensory feedback from the kite, the kite connecting lines, or the kite steering arrangement;
 the manipulator manipulates the base pivot point; and
 manipulating the base pivot point:
  pivots a frame type element in alignment with a spatial orientation of the kite in space; or
  to mimics a trajectory of the kite connecting lines extending between the kite steering arrangement and the kite.

14. A control device as claimed in claim 13, wherein the spatial orientation of the kite in space is measured by:
 an optical signal from the kite;
 a radar signal; or
 an acoustical/sonar signal from the kite.

15. A control device as claimed in claim 13, wherein the spatial orientation of the kite is measured by a GPS sensor mounted at the kite.

16. A control device as claimed in claim 1, wherein the communicator comprises a computer and a transmitter.

17. A control device as claimed in claim 1, wherein the communicator causes the kite steering arrangement to adjust lengths of the kite connecting lines by effecting one or more kite line length adjusters of the kite steering arrangement.

18. A control device as claimed in claim 17, wherein the kite line length adjusters comprises a reel, a winch, a linear actuator, a linear cylinder, a drive belt, a chain, or a deflector.

19. A control device as claimed in claim 1, wherein the communicator is configured to cause:
 adjustment of a location of the kite connecting lines extending from the kite; or
 movement of an attachment point of the kite connecting lines extending from the kite.

20. A control device as claimed in claim 1, wherein the communicator causes the kite steering arrangement to adjust actuators, rudders, elevators, ailerons, or servo tabs located at the kite by effecting one or more kite line length adjusters of the kite steering arrangement.

21. A control device as claimed in claim 1, comprising a display that displays actual tensional forces experienced by the kite connecting lines.

22. A control device as claimed in claim 1, comprising a display that displays a length of the kite connecting lines extending between the kite steering arrangement and the kite.

23. A control device as claimed in claim 1, comprising a translator adjuster that adjusts:
 an effect of a degree of pivoting; or
 displacement of the control bar relative to the control bar support on the kite steering arrangement.

24. A control device as claimed in claim 1, comprising a kite connecting line adjuster that adjusts respective lengths of the kite connecting lines, separate for each line, extending between the kite steering arrangement and the kite.

25. A control device as claimed in claim 1, comprising a rating or recording system configured to record:
 (A) user ratings of flight manoeuvres; and
 (B) positioning data of the kite; orientation data of the kite; tension data of the kite connecting lines; or steering inputs of the user at the control device.

26. The control device of claim 1, wherein the tensioning mechanism comprises at least one linear actuator.

* * * * *